United States Patent Office 3,516,968
Patented June 23, 1970

3,516,968
POLYCARBONATES FROM ADAMANTYL BISPHENOLS
Robert E. Moore, Wilmington, Del., and Irl N. Duling, West Chester, Pa., assignors to Sun Oil Company, Philadelphia, Pa., a corporation of New Jersey
No Drawing. Filed Mar. 17, 1969, Ser. No. 807,947
Int. Cl. C08g 17/13
U.S. Cl. 260—47
6 Claims

ABSTRACT OF THE DISCLOSURE

Polycarbonates having the repeating unit

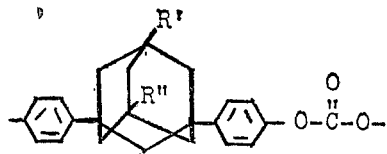

are prepared from an adamantane bisphenol of the structure

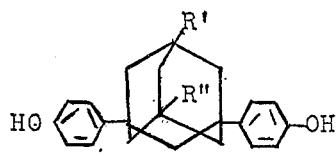

and phosgene where R' and R" are hydrogen or a hydrocarbon radical having 1–20 carbon atoms each such as methyl. Such polycarbonates are valuable in the production of films, filaments and shaped articles having excellent high temperature properties.

---

The present invention relates to polycarbonates wherein the repeating unit contains an adamantane bisphenol moiety of the structure

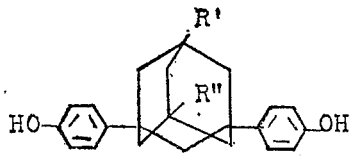

Adamantane (tricyclo[3.3.1.1$^{3,7}$]decane) has a carbon structure containing ten carbon atoms arranged in a completely symmetrical, strainless manner and is often described as a cage-like structure which consists of three condensed cyclohexane rings. There are four bridgehead carbon atoms which are equivalent to each other as are the rings. The adamantane structure is often depicted by:

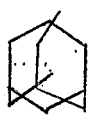

The polycarbonates of the present invention have the repeating structural unit

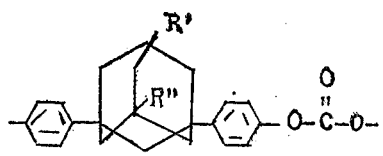

where R' and R" are radicals having 0–20 carbon atoms selected from the group consisting of hydrogen and hydrocarbyl. The term hydrocarbyl as used herein describes a monovalent hydrocarbon radical. Such hydrocarbyl radicals can be selected from the group consisting of alkyl, cycloalkyl, aryl, alkaryl and aralkyl. A preferred structure is one in which at least one of R' and R" is a hydrocarbyl radical and most preferred is one where both R' and R" are hydrocarbyl radicals having 1–20 carbon atoms. Although the number of carbon atoms in each substituent radical can range up to 20, it is generally preferred that each of R' and R" contain no more than 10 carbon atoms. Most preferred are R' and R" selected from the group consisting of methyl and ethyl, because of the ease with which 1,3-dimethyl- and 1,3-diethyladamantane are obtained.

The polycarbonates of the present invention are prepared from the adamantane bisphenols of the structure

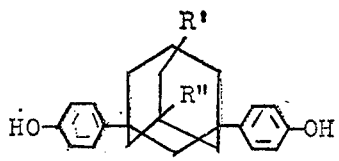

where R' and R" have the significance previously given and phosgene in a cooled, stirred mixture of a tertiary amine such as pyridine or triethylene amine and a solvent for the polycarbonate such as methylene chloride. A catalyst can be employed, although it is not seen to be necessary, since the maximum molecular weight of polymer is usually achieved in about .5 to 2 hours. The optimum temperature is about 20–30° C. Higher temperatures reduce the reaction time and result in lower molecular weight polymers as exhibited by lower polymer inherent viscosity ($\eta_{inh}$). Other conventional procedures such as an aqueous interfacial process or an ester interchange can be employed to produce the present polycarbonates.

The adamantane bisphenols are described in commonly assigned U.S. patent application Ser. No. 802,661, filed Feb. 26, 1969 by Robert E. Moore entitled Adamantane Bisphenols and are prepared by reacting a compound of the structure

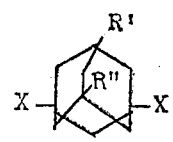

where R' and R" are as previously described and X is independently selected from the group consisting of bromo and chloro with an excess of phenol at a temperature in the range of 125 to 200° C. The reaction time for preparing the bisphenols will vary, particularly in regard to the temperature employed, from 4 to 10 hours. In practice the preferred procedure is to carry out the reaction at reflux which is around 178–185° C. (B.P. phenol 182° C.). At reflux the reaction requires 5 to 7 hours for good yields. No catalyst is required. The reaction takes place in an excess of phenol which also serves as the solvent for the adamantane reactant and the product. The adamantane bisphenol is most easily recovered by cooling the reaction mixture and pouring it into warm water (66–80° C.) thus precipitating the bisphenol and dissolving the phenol. The crystalline material is filtered and recrystallized, for example, from xylene, toluene or isopropanol-water.

The adamantane hydrocarbons are well known and their preparation is adequately described in the literature The dihalo derivatives can be prepared by reacting the corresponding adamantane hydrocarbon with chlorine or bromine in the presence of AlCl₃ or AlBr₃ as disclosed in Stetter and Wulff, German Pat. No. 101,410 and Stetter in Angew Chem. International Edit., vol. 1 (1962), No. 6, pages 287–288. The mixed bromo-chloro adamantane can be obtained by reacting a dibromo adamantane with a chlorine donor such as carbon tetrachloride in the presence of a Lewis acid catalyst as shown in the copending application of Robert E. Moore, Ser. No. 688,679, filed Dec. 7, 1967.

Examples of such suitable reactants to prepare the adamantane bisphenols are the bridgehead dichloro, dibromo or bromo-chloro derivatives of the following hydrocarbons:

admanantane;
1-methyladamantane;
1-ethyladamantane;
1,3-dimethyladamantane;
1-methyl-3-ethyladamantane;
1,3-diethyladamantane;
1-n-propyladamantane;
1-isopropyladamantane;
1-n-butyladamantane;
1,3-di-n-pentyladamantane;
1-methyl-3-heptyladamantane;
1-n-decyladamantane;
1-n-decyl-3-ethyladamantane;
1-methyl-3-propyladamantane;
1-isohexyladamantane;
1-methyl-3-cyclohexyladamantane;
1-phenyladamantane;
1-methyl-3-phenyladamantane;
1,3-diphenyladamantane;
1-p-tolyladamantane;
1-benzyladamantane;

and the like.

The following examples are presented to further illustrate the invention.

Example 1

32.2 grams (0.1 mole) of 1,3-dibromo-5,7-dimethyladamantane and 250 cc. of phenol were charged to a 500 ml., round-bottom flask equipped with a condenser. The flask was swirled to disolve the dibromo adamantane. The flask and contents were then heated under reflux (~180° C.) for several hours (5–6 hours). After the evolution of HBr had subsided, the reaction mixture was cooled, poured into warm water (~75° C.) and stirred to remove phenol. A white crystalline material precipitated and was recovered by filtration. The product, 29.6 grams, (85% theoretical) was recrystallized from toluene. It was identified by I.R., mass spectroscopy and N.M.R. as 1,3-bis (4-hydroxyphenyl)5,7-dimethyladamantane. Its properties are set out in Table I.

TABLE I

Molecular wt. ------------------------------------- 348
Melting point, ° C. ---------------------- 223—223.5
Heat of fusion, cal./mole ---------------------- 9840
Entropy of fusion, e.v. -------------------------- 2.0
Cryoscopic constant ---------------------------- 17.4

Example 2

The following were charged to a 250 cc. Morton flask equipped with mechanical stirrer, thermometer, condenser and gas inlet tube: 10.51 g. 1,3-bis(4-hydroxyphenyl)5,7-dimethyladamantane, (0.03 mole), 3.0 cc. pyridine (0.10 mole) and about 80 cc. methylene chloride. Nitrogen was bubbled through the system for 15–20 minutes to flush out the air and to thoroughly blanket the system. Phosgene was then bubbled in, briskly at first to replace the nitrogen, then slowly. The reaction temperature was maintained at 25–30° C. during the reaction. The reaction solution became extremely viscous after 1.5 hours. The addition of phosgene was stopped and the system purged with nitrogen for one our. The reaction mixture was diluted to a volume of 250 cc. with methylene chloride, washed with 10% HCl and followed by successive water washings until chloride ion could no longer be detected in the wash water. The methylene chloride solution was dried briefly over anhydrous calcium chloride and poured into a large excess of petroleum ether to precipitate the polymer. Filtration and air drying yielded 10.53 g. of polycarbonate (94% of theoretical). The recovered polymer was redissolved in methylene chloride, filtered, reprecipitated from petroleum ether, vacuum dried overnight at 50–60° C. to yield 10 g. (~90% yield) of polycarbonate having an inherent viscosity ($\eta_{inh}$) in methylene chloride at 100° F. of 0.69. Some properties of this polycarbonate and a commercial polycarbonate, Lexan, prepared from 2,2-bis(4-hydroxyphenyl) propane are set out in Table II.

Inherent viscosities ($\eta_{inh}$) were obtained at a concentration of 0.5 g./dl. at 100° F. Duplicate runs were made and flow times were reproducible within 0.2 second. Inherent viscosity is represented by the equation:

$$\eta_{inherent} = \ln \frac{\eta_{relative}}{c.}$$

where $$\text{relative} = \frac{t}{t_0}$$

$t_0$ = flow time through a viscometer of a liquid reference
$t$ = flow time through the same viscometer of dilute solution of polymer in reference liquid
$c.$ = concentration of polymer in solution expressed in grams/deciliter The solvent employed was methylene chloride.

Tensile properties were measured in accordance with ASTM D638–67T.

TABLE II.—PROPERTIES OF POLYCARBONATES

| Bisphenol | 2,2-bis(4-hydroxyphenyl) propane | 1,3-bis(4-hydroxyphenyl)-5,7-dimethyladamantane |
|---|---|---|
| Tg ° C.: | | |
| (DTA) | 150 | |
| (DSC) | | ¹ 225–250 |
| Melting temp., ° C. | 220–230 | Stable to 300 |
| $\eta_{inh}$ | 0.59 | 0.69 |
| $\eta_0{}^{20}$ | 1.5850 | 1.578–1.582 |
| Density | 1.199 | 1.146 |
| Shore D hardness | 80±2 | 83±2 |
| Tensile properties: | | |
| Stress, p.s.i. | 12,400 | 8,400 |
| Elongation, percent | 88 | 8 |
| Modulus, p.s.i. | 246,000 | 126,000 |

¹ Tg could not be clearly defined but appeared to be in the region indicated.

It can be seen that the polycarbonate of the present invention is an excellent material where temperature properties and stability are the prime considerations. Films cast from the adamantane bisphenol polycarbonate were tough, flexible, transparent and colorless.

The invention claimed is:
1. A composition of matter consisting essentially of a polycarbonate having the repeating structural unit

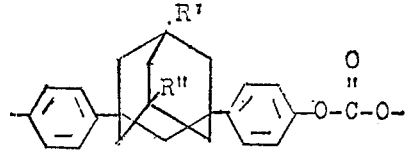

where R′ and R″ are radicals having 0–20 carbon atoms selected from the group consisting of hydrogen and hydrocarbyl.

2. The composition according to claim 1 wherein R′ and R″ are hydrocarbyl.

3. The composition according to claim 2 wherein the hydrocarbyl radical is selected from the group consisting of alkyl, cycloalkyl, aryl, alkaryl and aralkyl.

4. The composition according ot claim 3 wherein the hydrocarbyl radical has 1–10 carbon atoms.

5. The composition according to claim 4 wherein R' and R" are selected from the group consisting of methyl and ethyl.

6. The composition according to claim 5 wherein R' and R" are methyl.

References Cited

UNITED STATES PATENTS 3,342,880   9/1967   Reinhardt _____ 260—648

SAMUEL H. BLECH, Primary Examiner

U.S. Cl. X.R.

260—33.8, 619, 648